UNITED STATES PATENT OFFICE 2,201,109

DENATURED ALCOHOL COMPOSITION

Paul Mahler, New York, N. Y., and Carl Haner, Moylan, Pa., assignors to Publicker Inc., Philadelphia, Pa., a corporation of Delaware No Drawing. Application October 15, 1937,
Serial No. 169,255

1 Claim. (Cl. 202—77)

The present invention relates to certain new and useful denatured alcohol compositions and it relates more particularly to denatured alcohol compositions which will be more resistant to commercially feasible "clean-up" procedure and which will be more desirable for use for most commercial purposes.

We have found that certain organic compounds, in combination with ethyl alcohol, possess desirable denaturant qualities in that they resist the chemical "clean-up" technique as well as fractional distillation, and boil over or distil over with the alcohol, or at least in part, sufficient to impart to the resultant alcohol a characteristic taste and/or odor sufficient to make it unfit for beverage purposes.

Thus, we have found that an organic ester such as methyl butyrate, having a boiling point of approximately 102.3° C., in combination with ethyl alcohol of the usual commercial concentration, that is, about 95%, more or less, forms a denatured alcohol composition having an objectionable taste and/or odor which will resist all the commercially feasible "clean-up" steps, both chemical and physical, and will carry over into any recovered alcohol.

From one to two parts of methyl butyrate, by volume, to one hundred parts of alcohol, by volume (of the usual commercial concentration) have been found to be satisfactory.

The foregoing denatured alcohol composition of our present invention has the further advantage of being substantially neutral and thus not detracting from the normal commercial usage of neutral spirits.

We have found that in the foregoing composition an azeotropic mixture is formed having a boiling point sufficiently close to that of alcohol to prevent separation by fractional distillation.

The efficacy of a denaturant depends primarily on the difficulty with which it can be removed from the alcohol, and the degree of obnoxiousness imparted by the taste and/or odor of the recovered spirit.

To evaluate denaturants it is therefore essential to apply a "clean-up" testing technique sufficiently vigorous so that logical comparisons can be made.

Compared to the efficacy of many denaturants heretofore proposed, the denatured alcohol compositions according to our present invention, possess highly improved characteristics especially from the standpoint of difficulty of denaturant removal. For example, after subjection to a test for denaturant removal corresponding to the most drastic treatment commercially feasible, the denatured alcohol of the present invention is still unpotable. This drastic test comprises the dilution of the denatured alcohol with salt solution; treatment with solvent (as for instance toluene, $CCl_4$ etc.) followed by decantation; activated charcoal treatment; and then an oxidizing agent and finally distillation through a highly efficient fractionating column.

A far less drastic "clean-up" treatment will effectively remove, for instance, the type of denaturant substances which may properly be called higher aliphatic alcohols, such as:

$CH_3-CH-CHOH-CH-CH_3$ 2,4 dimethyl-pentanol-3 or di-
    |              |                isopropyl carbinol, boiling
    $CH_3$          $CH_3$           point 139° C.

$CH_2OH-CH-CH_2-CH_2-CH_3$ 2 methyl pentanol-1, boiling
         |                    point 147° C.
         $CH_3$ $CH_3OH-CH-CH_2-CH-CH_3$ 2,4 dimethyl pentanol-1, boil-
          |         |           ing point 139° C.
          $CH_3$    $CH_3$ This indicates that these alcohols do not form an azeotrope with 95% alcohol, whereas the materials remaining after the several cleaning-up steps do distil sufficiently with the alcohol from a 33% to 25% saline alcohol-water solution to impart some degree of protection to the recovered alcohol.

Denaturants of this type are disadvantageous, not only because they fail to form azeotropes with 95% alcohol, but also because they possess a lasting power of odor and have a lasting color which is imparted by them to the alcohol denatured thereby.

Adequate protection against cleaning-up is demanded by governing authorities, but detrimental properties, such as distasteful odors (initial or residual) or discoloration, will produce unfavorable reactions from the consumer.

A good denaturant should leave the denatured alcohol spirit composition as nearly alike to pure neutral spirits, as possible. It should only affect its taste both before and after attempting any commercially feasible cleaning-up technique. This means that a colorless material is more useful than one that is colored. Similarly, the less pronounced the odor the better will be the resultant denatured alcohol compositions for most commercial uses or purposes. If it is odorous, then the more agreeable it is in character the greater the advantage. If on evaporation there remains no residual odor, or only a slight one, it will be a desirable function. In other words, a good denaturant should leave the character of the original spirit (when used as such or in combination with other materials) as unaffected as possible, but protect the alcohol against any commercially feasible cleaning-up procedure. The lower the concentration of denaturant used, the greater advantage to the alcohol manufacturer, since he sells more of the material he produces, and less of the material which he must generally purchase.

The present invention may be embodied in other specific forms without departing from the spirit or essential attributes thereof, and it is therefore desired that the present embodiment be considered in all respects as illustrative and not restrictive, reference being had to the appended claim rather than to the foregoing description to indicate the scope of the invention.

Having thus described the invention, what is hereby claimed as new and desired to be secured by Letters Patent is:

A denatured alcohol composition including ethyl alcohol and methyl butyrate in the proportion of more or less approximately one to two parts of generally pure methyl butyrate, by volume, to one hundred parts of ethyl alcohol of the usual commercial concentration.

PAUL MAHLER.
CARL HANER.